(12) United States Patent
Shigeta (10) Patent No.: US 9,092,880 B2
(45) Date of Patent: Jul. 28, 2015

(54) IMAGE PROCESSING APPARATUS AND IMAGE PROCESSING METHOD

(71) Applicant: CANON KABUSHIKI KAISHA, Tokyo (JP)

(72) Inventor: Kazuyuki Shigeta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 14/049,357

(22) Filed: Oct. 9, 2013

(65) Prior Publication Data

US 2014/0140617 A1 May 22, 2014

(30) Foreign Application Priority Data

Nov. 20, 2012 (JP) ................. 2012-254648

(51) Int. Cl.
| | |
|---|---|
| *G06K 9/00* | (2006.01) |
| *G06T 3/40* | (2006.01) |
| *H04N 5/232* | (2006.01) |
| *H04N 5/235* | (2006.01) |
| *H04N 5/357* | (2011.01) |
| *H04N 9/04* | (2006.01) |

(52) U.S. Cl.
CPC ............ *G06T 3/4007* (2013.01); *H04N 5/2355* (2013.01); *H04N 5/23229* (2013.01); *H04N 5/357* (2013.01); *H04N 9/045* (2013.01)

(58) Field of Classification Search
CPC ....... G06T 3/40; G06T 3/4007; G06T 3/4015; G06T 5/002; G06T 5/20; G06T 2207/10024; H04N 5/217; H04N 5/2351; H04N 5/335; H04N 5/372; H04N 7/12; H04N 7/132; H04N 7/133; H04N 9/04; H04N 9/045; H04N 9/8042; H04N 11/04; H04N 11/16; H04N 2209/045; H04N 2209/046; G06F 17/175; G01D 5/347
See application file for complete search history.

(56) References Cited

U.S. PATENT DOCUMENTS

| | | | |
|---|---|---|---|
| 2006/0119724 A1* | 6/2006 | Inuiya ........................... | 348/311 |
| 2008/0218597 A1* | 9/2008 | Cho ............................ | 348/222.1 |
| 2010/0141809 A1* | 6/2010 | Fukutomi et al. ............. | 348/241 |

FOREIGN PATENT DOCUMENTS

| | | |
|---|---|---|
| JP | 2002-223350 A | 8/2002 |
| JP | 2003-230158 A | 8/2003 |

* cited by examiner

*Primary Examiner* — Jose Couso
(74) *Attorney, Agent, or Firm* — Fitzpatrick, Cella, Harper & Scinto (57) ABSTRACT

A first interpolating image generating unit interpolates a first image acquired from a first pixel group including first pixels to generate a first interpolating image. A second interpolating image generating unit interpolates a second image acquired from a second pixel group including second pixels at the same exposure as that of the first image, using a signal of the second image, to generate a second interpolating image. A sensitivity characteristic converting unit converts the generated first interpolating image and second interpolating image into images having the same sensitivity characteristics. An image synthesizing unit synthesizes the first interpolating image and second interpolating image, having been converted to have the same sensitivity characteristics, to generate a synthesized image.

6 Claims, 10 Drawing Sheets

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of the Related Art

Solid-state imaging apparatuses are required to improve S/N ratios and increase dynamic ranges. To meet such requirement, Japanese Patent Application Laid-Open No. 2002-223350 discloses a technique that takes at least two images in different exposure conditions, and synthesizes the images acquired at a long exposure time and a short exposure time to form an image with a wide dynamic range. Japanese Patent Application Laid-Open No. 2003-230158 discloses a technique of synthesizing multiple images that are generated from one imaging device and have different sensitivity characteristics to form an image with a wide dynamic range.

Unfortunately, in the method disclosed in Japanese Patent Application Laid-Open No. 2002-223350 that takes at least two images in different exposure conditions and synthesizes the images, a time difference in taking images to be synthesized occurs. Accordingly, when a still image of a moving object is taken, a malfunction, such as overlapping imaging on the moving part, occurs. There is thus a problem in that it is difficult to apply the technique disclosed in Japanese Patent Application Laid-Open No. 2002-223350 to moving images in terms of image quality.

In the method disclosed in Japanese Patent Application Laid-Open No. 2003-230158 that generates multiple images with different sensitivity characteristics from one imaging device to synthesize the images, pixels with multiple sensitivity characteristics are provided in the imaging device. There is thus a problem in that spatial interpolation for generating images with the respective sensitivity characteristics lacks image information other than information on the pixels with the corresponding sensitivity characteristics. The technique disclosed in Japanese Patent Application Laid-Open No. 2002-223350 causes a problem in that at least two images with different sensitivity characteristics are synthesized, the synthesized sensitivity characteristics form line graphs, and the gradation of the image residing over an inflection point is degraded.

The present invention intends to solve at least one of the above problems.

SUMMARY OF THE INVENTION

According to an aspect of the present invention, an image processing apparatus comprises: a first interpolating image generating unit configured to interpolate a first image acquired from a plurality of first pixels of a same color having a same sensitivity characteristic based on a signal of the first image, to generate a first interpolating image; a second interpolating image generating unit configured to interpolate a second image acquired from a plurality of second pixels for the same color as the color of the first pixels, having the same sensitivity characteristic as the sensitivity characteristic of the first pixels, by the same exposure as the first pixels based on a signal of the second image, to generate a second interpolating image; a sensitivity characteristic converting unit configured to convert the first and second interpolating images to have a same sensitivity characteristic; and an image synthesizing unit configured to synthesize a synthesized image from the first and second interpolating images converted to have the same sensitivity characteristic by the sensitivity characteristic converting unit.

DESCRIPTION OF THE EMBODIMENTS

Preferred embodiments of the present invention will now be described in detail in accordance with the accompanying drawings.

(First Embodiment)

A first embodiment of the present invention will be described.

Figure 1:
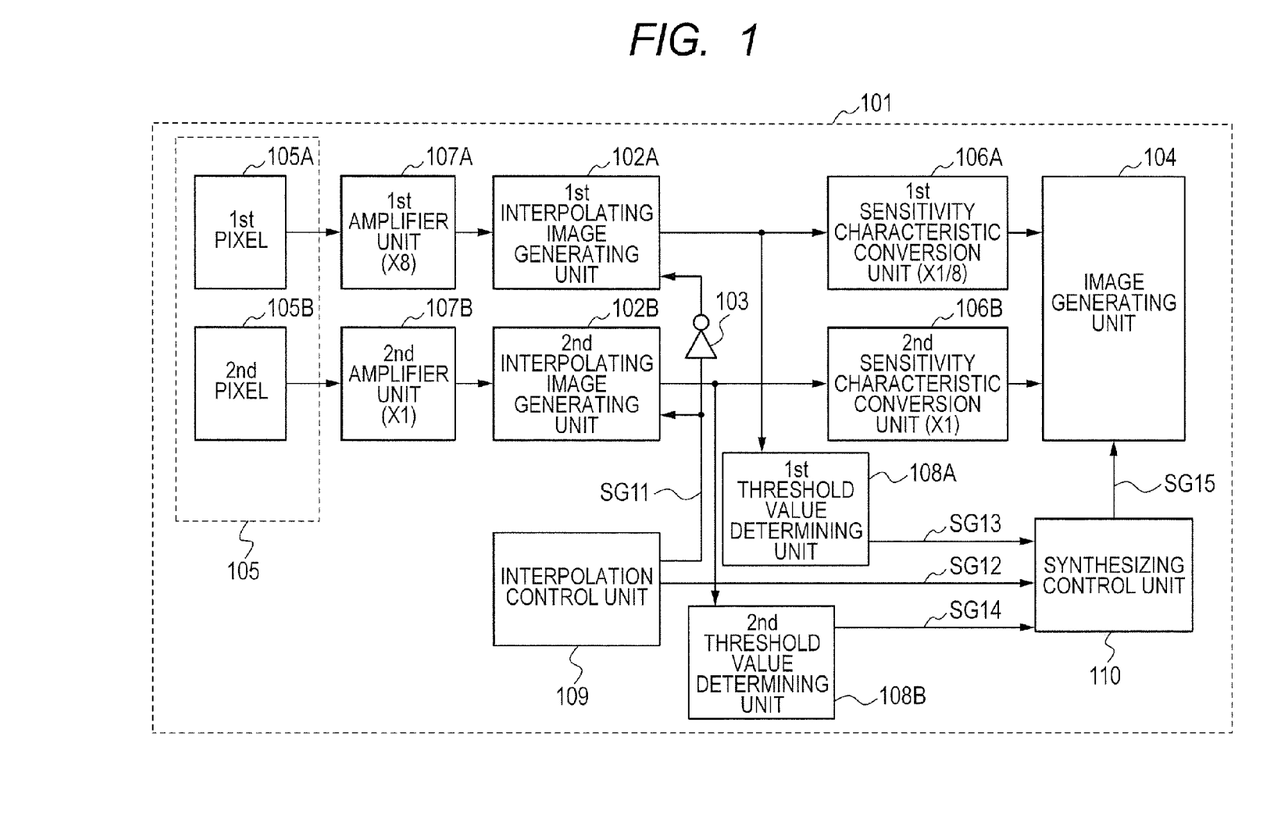
FIG. 1 is a diagram illustrating an example of a configuration of an image processing apparatus according to an embodiment of the present invention.

FIG. 1 is a block diagram illustrating an example of a schematic configuration of an image processing apparatus according to this embodiment. An image processing apparatus 101 includes a pixel unit 105 that includes a first pixel group including first pixels 105A, and a second pixel group including second pixels 105B different from the first pixels 105A in the first pixel group. The image processing apparatus 101 further includes amplifier units 107A and 107B, interpolating image generating units 102A and 102B, sensitivity characteristic converting units 106A and 106B, and an image synthesizing unit 104.

The first amplifier unit 107A amplifies a signal output from the first pixel group. The second amplifier unit 107B amplifies a signal output from the second pixel group. The first interpolating image generating unit 102A interpolates the signal of the first pixel group output from the first amplifier unit 107A to generate a first interpolating image. The second interpolating image generating unit 102B interpolates the signal of the second pixel group output from the second amplifier unit 107B to generate a second interpolating image. The first sensitivity characteristic converting unit 106A converts the sensitivity characteristic of the first interpolating image. The second sensitivity characteristic converting unit 106B converts the sensitivity characteristic of the second interpolating image. The image synthesizing unit 104 synthesizes the first interpolating image and the second interpolating image with sensitivity characteristics having been converted by the respective sensitivity characteristic converting units 106A and 106B, based on a synthesizing control signal SG15, to generate one synthesized image.

The image processing apparatus 101 further includes threshold determining units 108A and 108B, an interpolating control unit 109 and a synthesizing control unit 110. The first threshold determining unit 108A compares the signal level of the first interpolating image with a first threshold level, and outputs a comparison result as first determination information SG13. The second threshold determining unit 108B compares the signal level of the second interpolating image with a second threshold level, and outputs a comparison result as second determination information SG14. The interpolating control unit 109 outputs the interpolating control signal SG11 to control interpolating operations of the interpolating image generating units 102A and 102B.

The synthesizing control unit 110 generates a synthesizing control signal SG15, based on pieces of determination information SG13 and SG14 from the respective threshold determining units 108A and 108B, and the interpolation information SG12 from the interpolating control unit 109, and outputs the signal to the image synthesizing unit 104. The interpolation information SG12 is information representing details of the interpolation performed on pixel data, and is, for instance, information representing which pixels of the interpolating images generated by the interpolating image generating units 102A and 102B are for information on the original pixel signal, and which pixels are for information on the pixel signal generated by the interpolation. There is a case where interpolated pixels and non-interpolated pixels are not clearly discriminated from each other, and the ratios of interpolation coefficients are different. In such a case, the values of interpolation coefficients on the respective pixels correspond to the interpolation information.

Here, the pixels 105A and 105B include photoelectric converting devices that perform photoelectric conversion. The pixels 105A and 105B may further include an image output unit that converts charges occurring in the photoelectric conversion device into a voltage signal and outputs the signal, and an image selecting unit for selecting the pixels 105A and 105B. For simplicity of the drawings, in the pixel unit 105, only the two pixels 105A and 105B are illustrated. However, in actuality, the pixel unit 105 includes multiple pixels arranged in a matrix of m rows x n columns.

The pixel groups in the pixel unit 105 may be monochrome pixel groups or color pixel groups. The pixels 105A and 105B illustrated in FIG. 1 indicate pixels that are adjacent to each other and for the same color. For instance, in an example of a pixel unit including color filters of three colors, i.e., red, green and blue, the pixels 105A and 105B are pixels for red, pixels for green or pixels for blue. That is, the image processing apparatus 101 illustrated in FIG. 1 includes two different signal processing systems for pixels for the same color. These pixels have the same sensitivity characteristics, and are exposed at the same timing and for the same time period (same exposure). Here, the meaning of the same color also covers the case of monochrome pixels.

The amplifier units 107A and 107B can be set to have different gains. Here, the gain of the first amplifier unit 107A is eight. The gain of the second amplifier unit 107B is one. The sensitivity characteristic converting units 106A and 106B have conversion coefficients equivalent to the reciprocals of gains of the systems so as to correspond to the gains of the respective amplifier units 107A and 107B. Here, the conversion coefficient of the first sensitivity characteristic converting unit 106A is (1/8). The conversion coefficient of the second sensitivity characteristic converting unit 106B is one. Thus, two image signals processed by the two different signal processing systems having the same sensitivity characteristics as a whole are synthesized by the image synthesizing unit 104 into one image signal.

The image processing apparatus according to this embodiment causes the amplifier units 107A and 107B to amplify, by a prescribed gain, signals acquired at the same exposure from pixels that are for the same color, arranged adjacent to each other and have the same sensitivity characteristics. Before image synthesis, the images are converted back to image signals with the same sensitivity characteristics. Subsequently, one of the two types of signals is selected on a pixel-by-pixel basis, and the images are synthesized. Thus, on the pixels in a low luminance unit, the selection of the signals, in which noises occurring in processing paths from the amplifier units to the sensitivity characteristic converting units are suppressed, can improve the S/N ratio of the image and increase the dynamic range.

Figure 4A:
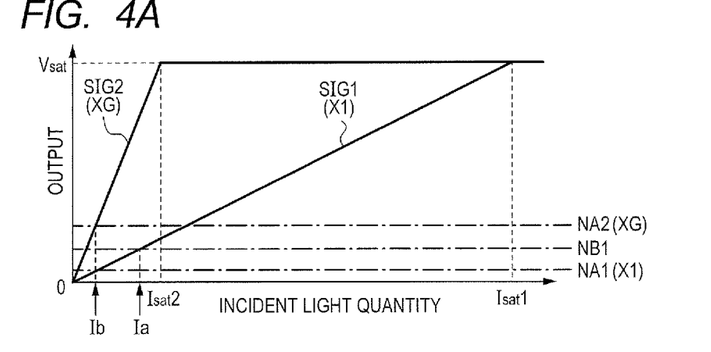
FIGS. 4A, 4B and 4C are diagrams for illustrating increase in dynamic range according to this embodiment.
Figure 4B:
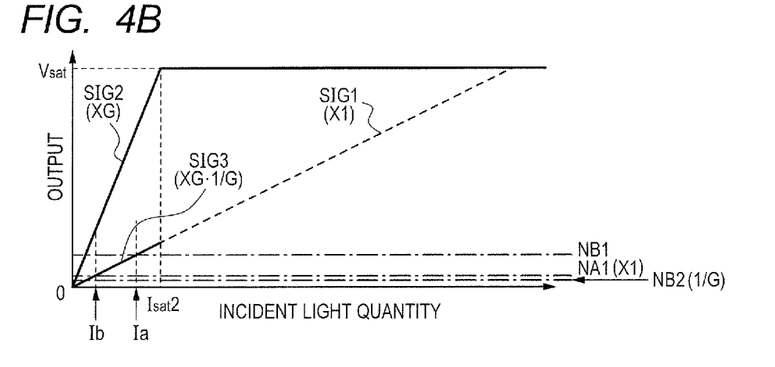
Figure 4C:
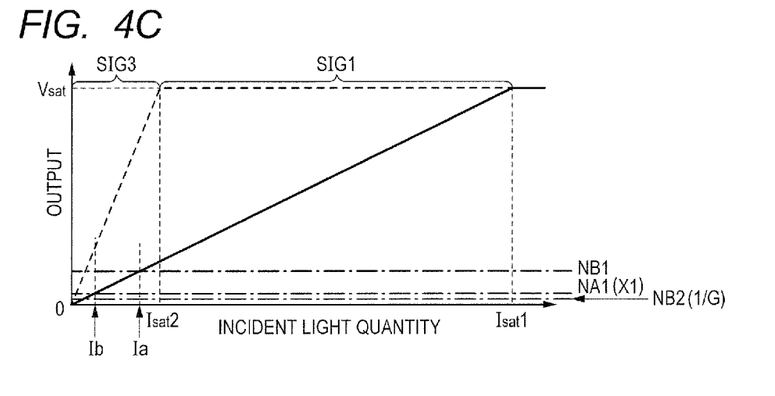

Increase in dynamic range in the image processing apparatus illustrated in FIG. 1 will be described with reference to FIGS. 4A to 4C. In FIGS. 4A to 4C, the abscissas indicate the quantity of light incident onto the pixel unit 105, and the ordinates indicate the magnitudes of outputs of the amplifier unit. In FIGS. 4A to 4C, an output SIG1 indicates an output level from the second amplifier unit 107B with respect to the quantity of the light incident onto the pixel unit 105 where the gain of the second amplifier unit 107B illustrated in FIG. 1 is one. An output SIG2 indicates an output level from the first amplifier unit 107A with respect to the quantity of light incident onto the pixel unit 105 where the gain of the first amplifier unit 107A illustrated in FIG. 1 is G. An output SIG3 indicates an output level from the first sensitivity characteristic converting unit 106A with respect to the quantity of light incident onto the pixel unit 105 where the gain of the first amplifier unit 107A illustrated in FIG. 1 is G.

FIGS. 4A to 4C illustrate pixel noises NA1 and NA2 caused by the pixels 105A and 105B, respectively, and output noises NB1 and NB2 due to circuits from the amplifier units 107A and 107B to the sensitivity characteristic converting units 106A and 106B, respectively. The pixel noise NA2 corresponds to the pixel noise NA1 amplified by G-fold. The output noise NB2 corresponds to the output noise NB1 amplified by (1/G)-fold.

The pixel noises NA1 and NA2 are, for instance, noises occurring in image output units and image selecting units included in the pixels. For instance, in the case where the image output unit and a constant current source provided on a vertical signal line configure a source-follower circuit, temporal fluctuation of the value of current flowing at the constant current source may be a factor of the pixel noises NA1 and NA2. The output noises NB1 and NB2 include, for instance, noises caused by driving an AD (analog-to-digital) converter residing in a circuit from the amplifier unit to the sensitivity characteristic converting unit, although not illustrated. The pixel noises NA1 and NA2 and the output noises NB1 and NB2 temporally vary. FIGS. 4A to 4C illustrate the noise levels.

As illustrated in FIG. 4A, when the incident light quantity exceeds Isat1, the output SIG1 is saturated to be Vsat. Even if the saturation level Vsat is at the saturation level of the amplifier unit 107 or at the saturation level of the circuit from the amplifier unit to the sensitivity characteristic converting unit, the following discussion is applicable. If the gain of the second amplifier unit 107B is one, the output noise NB1 is dominant because the output noise NB1 is generally higher than the pixel noise NA1. This characteristic appears because the pixel unit 105 of a typical imaging device is horizontally scanned and thus driven at a low speed in a narrow frequency band, and the output amplifier sequentially outputs signals and is thus driven at a high speed in a wide frequency band. That is, signals of pixels receiving an incident light quantity where the output SIG1 is lower than the quantity of the output noise NB1, i.e., signals of pixels receiving an incident light quantity lower than Ia, cannot be correctly taken from the pixel unit 105 owing to the output noise NB1. For instance, it is provided that the output level of the pixels is v0 that is lower than the output noise NB1. Here, at the timing when the output v0 is output, in a certain case, the level of noise is low and the output level correctly corresponds to the incident light quantity, but in another case, the output is v0 owing to the noise even though a level lower than v0 is originally to be acquired.

Here, a case is assumed where a G-fold (G>1) gain is applied by the first amplifier unit 107A to the signal output from the first pixel 105A disposed adjacent to the second pixel 105B from which the output SIG1 is acquired. The output SIG2 reaches a saturation output Vsat at an incident light quantity Isat2 lower than the output SIG1. In other words, the higher the gain G of the first amplifier unit 107A is, the higher the slope of the line SIG2 representing the output of the first amplifier unit 107A with respect to the incident light quantity is.

Change in gain of the first amplifier unit 107A amplifies not only the signal component but also the pixel noise NA1 by G-fold to be the pixel noise NA2. However, the output noise NB1 does not depend on the gain of the first amplifier unit 107A. Accordingly, if the gain of the first amplifier unit 107A is increased, the amplified pixel noise NA2 exceeds the output noise NB1. That is, the pixel noise NA2 amplified by setting the gain of the first amplifier unit 107A to be G is dominant, and the output noise NB1 becomes relatively low. In this case, signals that can be correctly captured are on and after those where the level of the output SIG2 exceeds the pixel noise NA2. Accordingly, the signal at the incident light quantity incapable of being correctly captured owing to the output noise NB1 that is dominant if the gain of the first amplifier unit 107A is one, is allowed to be captured. Setting of the gain of the first amplifier unit 107A to be G allows the signal to be correctly captured in a range from the incident light quantities Ib to Ia. The dynamic range thus increases accordingly.

In a range of the incident light quantities from 0 to Ia, the output SIG2 output from the first amplifier unit 107A is considered to be used. In a range of the incident light quantities higher than Ia, the output SIG1 output from the second amplifier unit 107B is considered to be used. However, if the outputs SIG1 and SIG2 are used as they are, the signal level largely varies at the incident light quantity Ia as a boundary. Thus, the output SIG2 output from the first amplifier unit 107A is converted by the first sensitivity characteristic converting unit 106A by (1/G)-fold to acquire the output SIG3 illustrated in FIG. 4B. As illustrated in FIG. 4B, the output SIG3 acquired by multiplying the output signal SIG2 by (1/G) has the same output characteristics for the incident light quantity as those of the output SIG1. Likewise, the pixel noise NA2 is multiplied by (1/G) to match with the pixel noise NA1. However, the output noise NB1 does not vary even if the gain of the first amplifier unit 107A is set to G. Accordingly, multiplication of (1/G)-fold by the first sensitivity characteristic converting unit 106A acquires the output noise NB2.

That is, multiplication of (1/G)-fold by the first sensitivity characteristic converting unit 106A reduces the noise component due to the output noise in a range of the incident light quantities from 0 to Isat2. Accordingly, the output SIG3 has a higher S/N ratio with respect to the output noise than the output SIG1 has. Also in the range of the incident light quantities from Ia to Isat2, use of the output SIG3 allows a signal with a high S/N ratio to be acquired. In the region up to the incident light quantity Isat2, the object is relatively dark and the signal S is low. Accordingly, reduction in noise level significantly increases the S/N ratio.

As described above, as illustrated in FIG. 4C, in the range of the incident light quantities from 0 to Isat2, the output SIG3 is used, and, in the range of the incident light quantities higher than Isat2, the output SIG1 is used. At the point of the incident light quantity Isat2, either of the outputs can be used. However, the output SIG3 is desired to be used because the output SIG3 achieves a higher S/N ratio. In terms of the output noise and the pixel noise, in the range of the incident light quantities from 0 to Isat2, the pixel noise NA1 is more dominant than the output noise NB2. In the range of the incident light quantities higher than Isat2, the output noise NB1 is more dominant than the pixel noise NA1. Note that in the range of the incident light quantities lower than Ib, the output SIG3 is at a lower level than the level of the pixel noise NA1. Accordingly, only in a range of the incident light quantities higher than Ib, the signal output from the pixels are effective. However, as described above, the output noise and the pixel noise have temporal fluctuation. Accordingly, if the images are sequentially captured as in the case of moving images, noise components are averaged. Thus, the level becomes lower than the level of the pixel noise NA1 as a whole. This characteristic allows recognition of a part of an image in a region where the output SIG3 is lower than the pixel noise NA1. That is, the output noise in the range where the incident light quantity is low is suppressed, thereby exerting an advantageous effect of increasing possibility of image recognition even in the case of the incident light quantity where the output is lower than the pixel noise NA1 in FIG. 4B.

The example of amplification of the signals output from the pixels that are for the same color and have the same sensitivity by two types of gains has been described above. However, the scope is not limited thereto. Signals output from different pixels that have the same sensitivity may be amplified by at least three types of gains. This amplification can achieve improvement in S/N ratio in a wider range of incident light quantities. For instance, not only the case where the gain of the amplifier unit is set to eight and combined with one, but also further addition of signals amplified by a 32-fold gain, can further increase the luminance range capable of acquiring signals. The case where the gains of the amplifier units 107A and 107B are set to G and one, respectively, has been described. However, the combination of the gains is not limited to such a case. For instance, any of combination of 16-fold and 2-fold and combination of 4-fold and 0.5-fold may be adopted.

In the above description, the sensitivity characteristic converting unit performs a process of multiplying the G-fold amplified signal by (1/G), which is the reciprocal of the gain of the amplifier units 107A and 107B. However, this process is for matching the characteristics of two signals acquired by amplification by different gains with each other (to align the characteristics on the same line as illustrated in FIG. 4C). Accordingly, the signal is not necessarily amplified by (1/G). For instance, in the case where the amplifier units 107A and 107B amplify signals by a 2-fold gain and a 16-fold gain, multiplication of the 16-fold amplified signal by (1/8) can match the characteristics with those of the other signal. Multiplication of the 2-fold amplified signal by (1/2) and multiplication of the 16-fold amplified signal by (1/16) can also match the sensitivity characteristics with each other.

Thus, at the image synthesizing unit 104, the two series of image signals to be synthesized have the same sensitivity characteristics. Accordingly, even on the boundary of the image signals, the sensitivity characteristics are not discontinuous, degradation in gradation can be suppressed, and degradation in image quality, such as pseudo-contours, hardly occurs.

For ease of understanding, it has been described that the signal of the first pixel 105A and the signal of the second pixel 105B arranged adjacent thereto are synthesized. In actuality, since the pixels 105A and 105B are disposed at different positions, spatial sampling positions are different from each other. Accordingly, signals to be synthesized are compensated with data acquired by the interpolating image generating units 102A and 102B, which are provided between the amplifier units 107A and 107B and the sensitivity characteristic converting units 106A and 106B, interpolating actually sampled data. In this embodiment, the interpolation is spatial pixel interpolation for recovering a resolution having been reduced by dividing the pixel group for the same color into the first pixel group and the second pixel group. The pixel interpolation between the interpolating image generating units 102A and 102B will hereinafter be described.

Figure 11A:
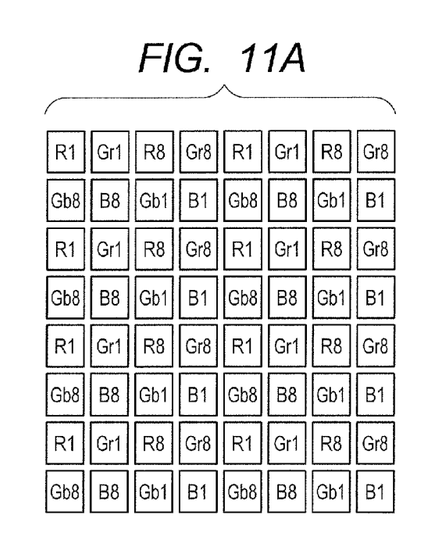
FIGS. 11A, 11B, 11C and 11D are diagrams for illustrating pixel interpolation in this embodiment.

Since pixels of another signal processing system correspond to the image, the interpolating image generating units 102A and 102B interpolate signals of pixels at positions that are not included in the own signal processing system with signals of own pixels adjacent thereto, and generate an image. FIG. 11A is a diagram illustrating an example of pixel arrangement in the pixel unit of the imaging device of this embodiment. In FIG. 11A, symbols R, G and B denote pixels for colors, i.e., red, green and blue, respectively. Numerals 1 and 8 illustrated subsequent to the symbols R, G and B denote pixels where a signal is input into an amplifier unit with a gain of one, and pixels where a signal is input into an amplifier unit with a gain of eight. Here, description is made using an example where the gain G of the amplifier unit is eight.

Figure 11B:
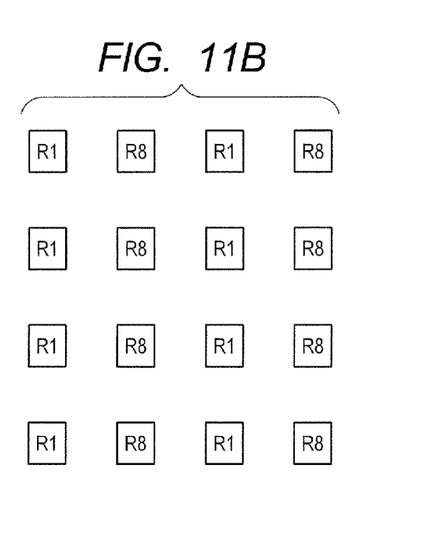
Figure 11C:
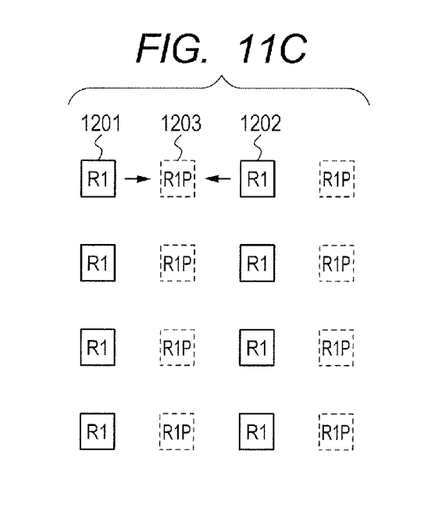
Figure 11D:
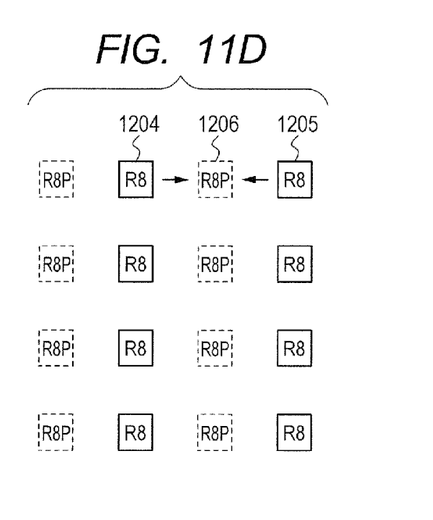

Here, discussion is separately made on each color. FIG. 11B is a diagram illustrating a pixel arrangement in the case of assuming only red (R) pixels. The red pixels are divided according to two types of different gains. Here, for instance, it is assumed that the R1 pixel corresponds to the pixel 105A of the first pixel group, and the R8 pixel corresponds to the pixel 105B of the second pixel group. The interpolating image generating units 102A and 102B form interpolating images as illustrated in FIGS. 12C and 12D from the pixel group with each gain. FIG. 12C illustrates the case of forming images using only R1 pixels having the 1-fold gain. For instance, at R1P pixels 1203 without information on the 1-fold gain, the signal is formed by pixel interpolation using R1 pixels 1201 and 1202 adjacent to each other. Likewise, FIG. 12D illustrates the case of forming images using only R8 pixels having the 8-fold gain. For instance, at R8P pixels 1206 without information on the 8-fold gain, the signal is formed by pixel interpolation using R8 pixels 1204 and 1205 adjacent to each other.

For instance, the interpolation timing information is provided, as the interpolating control signal SG11, from the interpolating control unit 109, such as a timing generator of the system, for the interpolating image generating units 102A and 102B. In the example illustrated in FIG. 1, the first interpolating image generating unit 102A is supplied with the interpolating control signal SG11 via an inverter 103, and the second interpolating image generating unit 102B is supplied with the interpolating control signal SG11 as it is. That is, first and second interpolating image generating units 102A and 102B are provided with the interpolating control signals SG11 having different polarities.

As described above, the two image signals are synthesized by the image synthesizing unit 104 according to the synthesizing control signal SG15 from the synthesizing control unit 110. In this embodiment, the image synthesizing unit 104 synthesizes the two image signals input from the first sensitivity characteristic converting unit 106A and the second sensitivity characteristic converting unit 106B while switching according to the synthesizing control signal SG15 on a pixel-by-pixel basis.

The signal output from the first interpolating image generating unit 102A is input into the first threshold determining unit 108A. The signal output from the second interpolating image generating unit 102B is input into the second threshold determining unit 108B. The threshold determining units 108A and 108B determine whether the input signal levels are higher or lower than respectively set thresholds, and output pieces of determination information SG13 and SG14. The synthesizing control unit 110 determines which one of the two series of image signals is to be used for the image synthesis, based on the pieces of determination information SG13 and SG14. In this embodiment, the synthesizing control unit 110 generates the synthesizing control signal SG15 using not only the pieces of determination information SG13 and SG14 from the threshold determining units 108A and 108B but also the interpolation information SG12 from the interpolating control unit 109.

As a comparative example with respect to the image synthesis in this embodiment, an example of conventional image synthesis will be described. FIGS. 5A to 5E are diagrams illustrating an example of conventional image synthesis. The example illustrated in FIGS. 5A to 5E represents the case where a threshold is set only on the signal of the second interpolating image acquired from the second pixel group, for synthesis. FIGS. 5A to 5E illustrate pixel data 501 actually sampled and output from the first pixel, and pixel data 502 actually sampled and output from the second pixel. Broken lines imaginarily represent an incident luminance signal from an actual object.

Figure 5A:
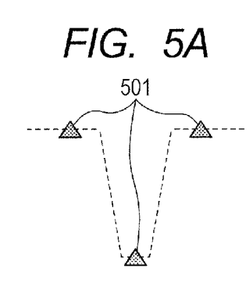
FIGS. 5A, 5B, 5C, 5D and 5E are diagrams illustrating an example of conventional image synthesis.
Figure 5B:
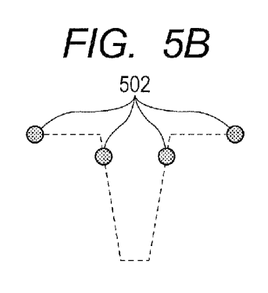
Figure 5C:
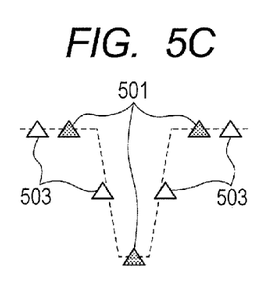
Figure 5D:
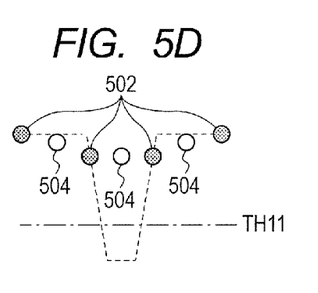

After signals output from a first pixel group are acquired as illustrated in FIG. 5A and signals output from the second pixel group are acquired as illustrated in FIG. 5B, signals at positions where the other pixels reside are interpolated to generate data. Here, for instance, average values of pixels adjacent to each other are calculated to thereby generate interpolation data. The pixel interpolation acquires a first interpolating image as illustrated in FIG. 5C, and a second interpolating image as illustrated in FIG. 5D. Interpolation data 503 is generated based on adjacent first pixels. Interpolation data 504 is generated based on adjacent second pixels.

Figure 5E:
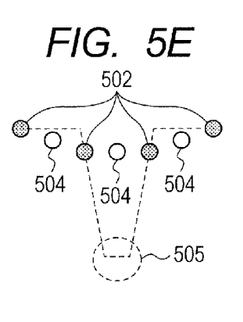

With reference to the signal level of the second interpolating image illustrated in FIG. 5D, determination is made at a threshold level TH11. As a result of determination, if the threshold is exceeded, the signal of the second interpolating image is used; if the threshold is not reached, a signal acquired by multiplying the signal of the first interpolating image by (1/8); images are thus synthesized to acquire a synthesized image as illustrated in FIG. 5E. Here, in an actual image, the pixel at a position 505 is only one pixel having a low luminance level with respect to surrounding pixels having high luminance levels. A signal of the pixel at the position 505 is actually sampled in FIG. 5C. Accordingly, the signal has the same value as the value of a luminance signal from the object. Instead, in FIG. 5D, the signal is acquired by interpolation. Accordingly, the signal largely deviates from the luminance signal from the object. However, in image synthesis, on the pixel at the position 505, a signal of the second interpolating image is selected, and information lacks at the position 505 in the synthesized image.

Figure 6:
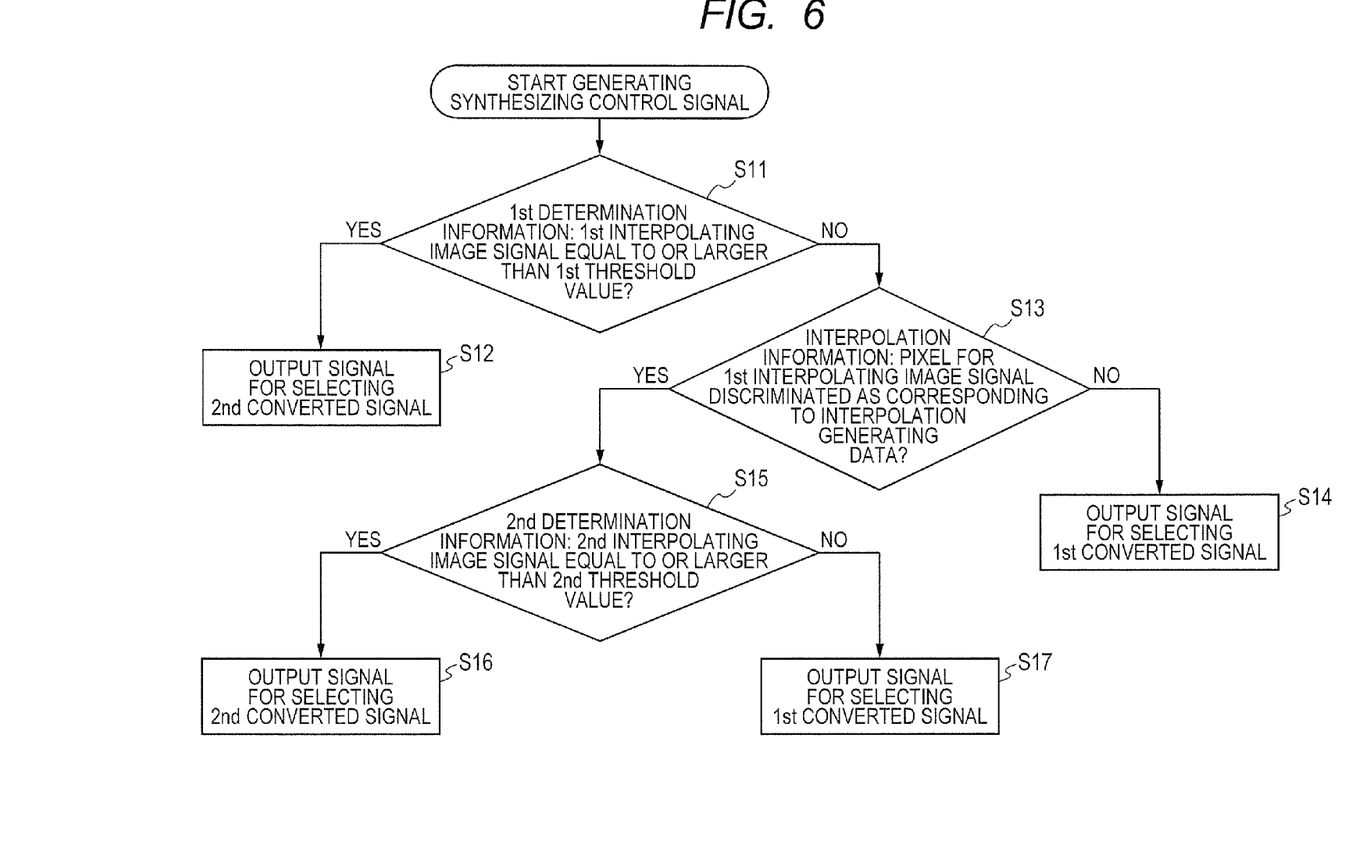
FIG. 6 is a flowchart illustrating an example of a process of generating a synthesizing control signal according to the first embodiment.

On the contrary, in this embodiment, the synthesizing control signal SG15 for synthesizing multiple images on a pixel-by-pixel basis is generated according to a flowchart illustrated in FIG. 6 to thereby prevent image quality from being degraded. That is, the synthesizing control signal SG15 is generated using not only the pieces of determination information SG13 and SG14 based on the luminance level of the image but also the pieces of interpolation information SG12 that represent whether the signal of the object pixels are a signal of pixels generated by interpolation or not. FIG. 6 is a flowchart illustrating an example of generating the synthesizing control signal SG15 that is performed by the synthesizing control unit 110.

When generation of the synthesizing control signal is started, first, in step S11, the synthesizing control unit 110 performs determination based on the first determination information SG13 from the first threshold determining unit 108A. As a result of the determination, if the first determination information SG13 represents that the signal of the first interpolating image at the object pixels is equal to or larger than the first threshold value, in step S12 the synthesizing control unit 110 generates synthesizing control signal SG15 so as to select the signal of the second interpolating image and outputs the signal. In contrast, as a result of the determination in step S12, if the first determination information SG13 does not represent that the signal of the first interpolating image at the object pixels is equal to or larger than the first threshold value, the processing proceeds to step S13.

In step S13, the synthesizing control unit 110 refers to the interpolation information SG12 from the interpolating control unit 109, and examines whether the signal of the first interpolating image at the object pixels is a signal generated by interpolation or an original signal without interpolation. As a result, if the signal is the original signal without interpolation, the synthesizing control unit 110 generates the synthesizing control signal SG15 so as to select the signal of the first interpolating image and outputs the signal in step S14. In contrast, if the signal has been generated by interpolation, the processing proceeds to step S15.

In step S15, the synthesizing control unit 110 performs determination based on the second determination information SG14 from the second threshold determining unit 108B. As a result, if the second determination information SG14 represents that the signal of the second interpolating image at the object pixels is equal to or larger than the second threshold value, the synthesizing control unit 110 generates the synthesizing control signal SG15 so as to select the signal of the second interpolating image and outputs the signal in step S16. In contrast, as a result of the determination in step S15, if the second determination information SG14 does not represent that the signal of the second interpolating image at the object pixels is equal to or larger than the second threshold value, the processing proceeds to step S17. In step S17, the synthesizing control unit 110 generates the synthesizing control signal SG15 so as to select the signal of the first interpolating image and outputs the signal.

FIGS. 7A to 7E illustrate an example of image synthesis according to the synthesizing control signal SG15 generated as described above. FIGS. 7A to 7E illustrate pixel data 501 actually sampled and output from the first pixels, and pixel data 502 actually sampled and output from the second pixel. Broken lines imaginarily represent an incident luminance signal from an actual object.

Figure 7A:
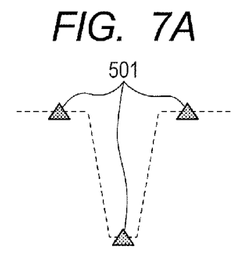
FIGS. 7A, 7B, 7C, 7D and 7E are diagrams illustrating an example of image synthesis according to the first embodiment.
Figure 7B:
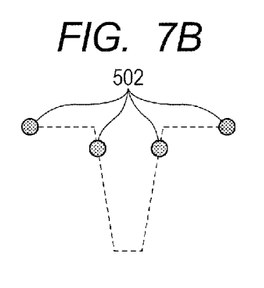
Figure 7C:
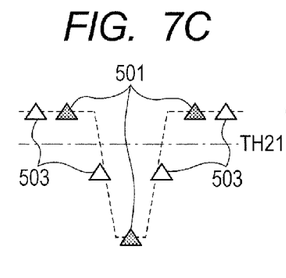
Figure 7D:
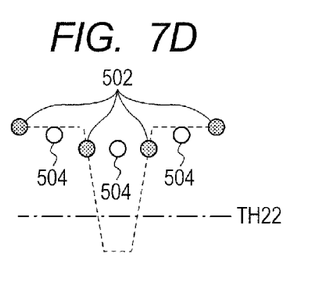

After signals output from a first pixel group are acquired as illustrated in FIG. 7A and signals output from the second pixel group are acquired as illustrated in FIG. 7B, signals at positions where the other pixels reside are interpolated to generate data. FIG. 7C illustrates the signal of the first interpolating image generated by pixel interpolation based on the signal output from the first pixel group. FIG. 7D illustrates the signal of the second interpolating image generated by pixel interpolation based on the signal output from the second pixel group. Interpolation data 503 is generated based on the adjacent first pixels. Interpolation data 504 is generated based on the adjacent second pixels.

Figure 7E:
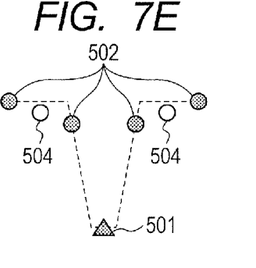

The signal of the pixel illustrated as the position 505 in FIG. 5E corresponds to an actually sampled signal in FIG. 7C. Accordingly the signal has the same value as the luminance signal from the object. However, in FIG. 7D, the signal is an interpolated signal and largely deviates from the luminance signal from the object. In this embodiment, with reference to the signal level of the first interpolating image illustrated in FIG. 7C, determination is made at a first threshold level TH21, and with reference to the signal level of the second interpolating image illustrated in FIG. 7D, determination is made at a second threshold level TH22. Furthermore, at the determination, it is also determined whether the signal of the object pixel is an interpolated signal or not, using the interpolation information SG12. Processes are performed according to the flowchart illustrated in FIG. 6, and the signals of the first and second interpolating images are selected and synthesized to thereby acquire a synthesized image as illustrated in FIG. 7E. As a result, in the synthesized image in this embodiment, the signal of the first interpolating image 501 is selected at the pixel illustrated as the position 505 in FIG. 5E. This selection can prevent lack of information.

Figure 8:
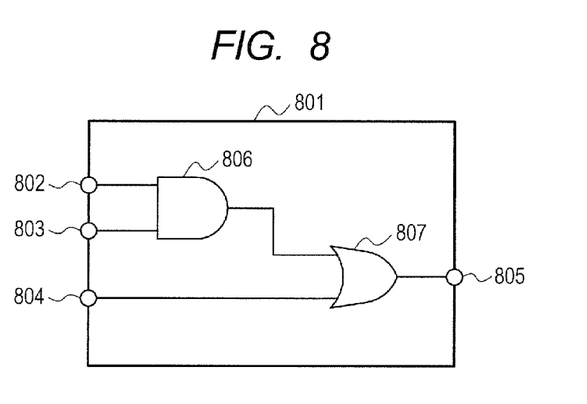
FIG. 8 is a diagram illustrating an example of a configuration of a synthesizing control unit according to the first embodiment.

FIG. 8 illustrates a circuit diagram illustrating an example of the configuration of the synthesizing control unit 110 in the first embodiment. The process of generating the synthesizing control signal SG15 illustrated in FIG. 6 can be implemented by software. Instead, as illustrated in FIG. 8 as an example, the process can be realized by combination of logic gate devices as hardware.

FIG. 8 illustrates the entire block 801 of the synthesizing control unit. An input terminal 802 is for the second determination information SG14. The second determination information SG14 represents that the signal of the second interpolating image has a value equal to or larger than the second threshold value if the information is at a high level. The information represents that the signal of the second interpolating image has a value less than the second threshold value if the information is at a low level. An input terminal 803 is for the interpolation information SG12. The interpolation information SG12 represents that the signal of the first interpolating image at the object pixels is a signal generated by interpolation if the information is at the high level. The information represents that the signal of the first interpolating image at the object pixels is an original signal, if the information is at the low level. An input terminal 804 is for the first determination information SG13. The first determination information SG13 represents the signal of the first interpolating image is equal to or larger than the first threshold value if the information is at the high level. The information represents the signal of the first interpolating image has a value less than first threshold value if the information is at the low level.

An output terminal 805 is for the synthesizing control signal SG15. Here, the image synthesizing unit 104 illustrated in FIG. 1 selects the signal input from the second sensitivity characteristic converting unit 106B as the signal of an output image if the synthesizing control signal SG15 output from the output terminal 805 of the synthesizing control unit 110 is at the high level. The image synthesizing unit 104 selects the signal input from the first sensitivity characteristic converting unit 106A as the signal of the output image if the synthesizing control signal SG15 output from the output terminal 805 of the synthesizing control unit 110 is at the low level.

The three input terminals 802, 803 and 804 are connected to the one output terminal 805 via two logic gates 806 and 807. Signals input from the input terminals 802 and 803 are input into the AND gate (logical multiplication processing circuit) 806. The output signal from the AND gate 806 and the signal input from the input terminal 904 are input into the OR gate (logical addition processing circuit) 807. The output signal from the OR gate 807 is output from the output terminal 805. Thus, the processes equivalent to the processes of the flowchart illustrated in FIG. 6 can be implemented by hardware.

Thus, in this embodiment, with reference to the signal levels, it is determined which one of the signal generated by interpolation on one image and the signal without interpolation at the same position on the other image is to be selected to be used. This selection can suppress lack of information at high frequencies, and acquire a high quality image that has a wide dynamic range and a high S/N ratio.

(Second Embodiment)

Next, a second embodiment of the present invention will be described.

The second embodiment to be described below is different from the first embodiment in the process of generating the synthesizing control signal SG15 by the synthesizing control unit 110. Other points are analogous to the points in the first embodiment. Accordingly, description on these points is omitted. The process of generating the synthesizing control signal SG15 according to the second embodiment will hereinafter be described.

Figure 9:
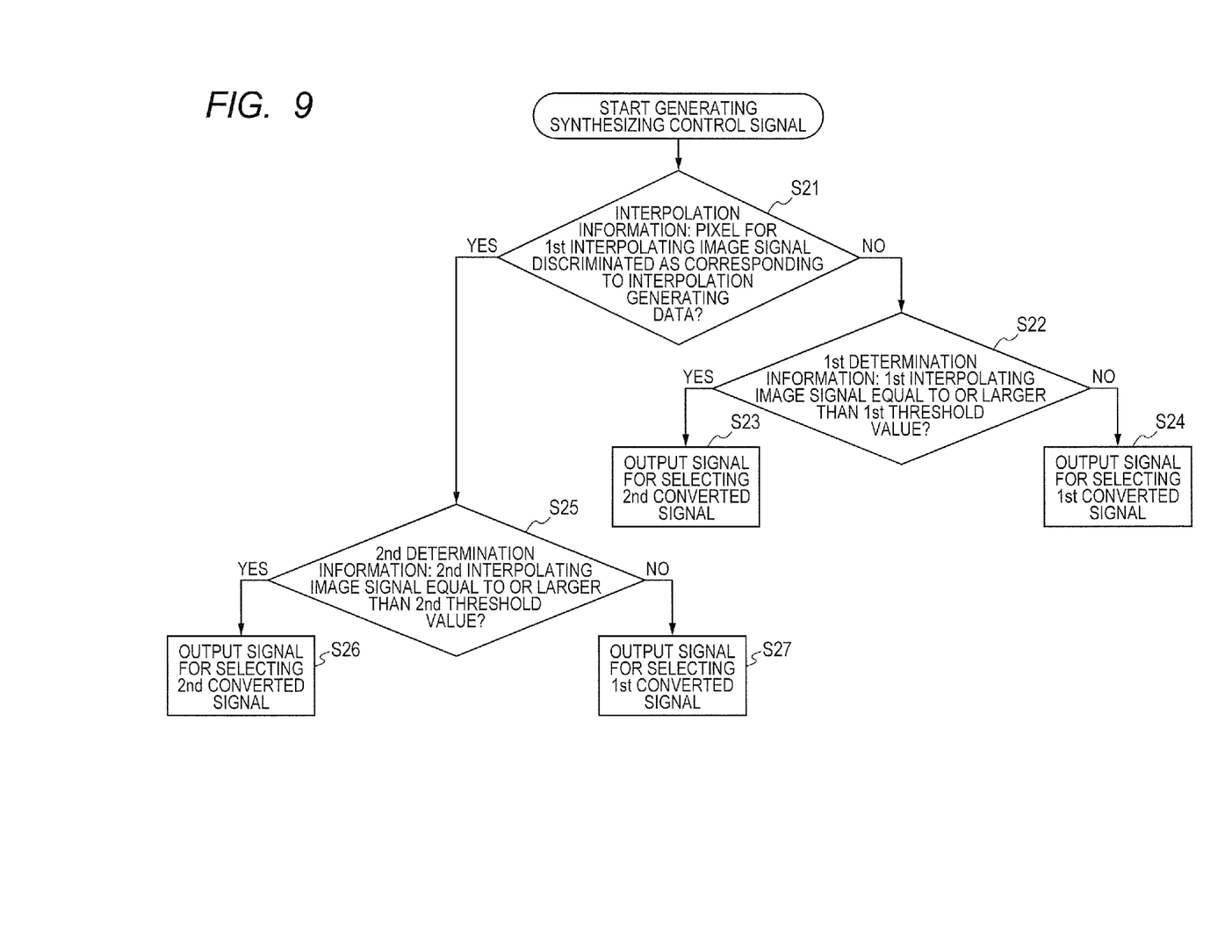
FIG. 9 is a flowchart illustrating an example of a process of generating a synthesizing control signal in a second embodiment.

FIG. 9 is a flowchart illustrating an example of the process of generating the synthesizing control signal SG15 according to the second embodiment. When the generation of the synthesizing control signal SG15 is started, first, in step S21, the synthesizing control unit 110 refers to the interpolation information SG12 from the interpolating control unit 109, and examines whether the signal of the first interpolating image at the object pixels is a signal generated by interpolation or not. As a result, if the signal is not a signal generated by interpolation but an original signal, the processing proceeds to step S22. If the signal is a signal generated by interpolation, the processing proceeds to step S25.

In step S22, the synthesizing control unit 110 performs determination based on the first determination information SG13 from the first threshold determining unit 108A. As a result of the determination, if the first determination information SG13 represents that the signal of the first interpolating image at the object pixels has a value equal to or larger than the first threshold value, the synthesizing control unit 110 outputs synthesizing control signal SG15 so as to select the signal from the second sensitivity characteristic converting unit 106B in step S23. In contrast, as a result of the determination in step S22, if the first determination information SG13 does not represent that the signal of the first interpolating image at the object pixels has a value equal to or larger than the first threshold value, the processing proceeds to step S24. In step S24, the synthesizing control unit 110 outputs the synthesizing control signal SG15 so as to select the signal from the first sensitivity characteristic converting unit 106A.

If the processing proceeds to step S25, the synthesizing control unit 110 performs determination based on the second determination information SG14 from the second threshold determining unit 108B in step S25. As a result of the determination, if the second determination information SG14 represents that the signal of the second interpolating image at the object pixels has a value equal to or larger than the second threshold value, the synthesizing control unit 110 outputs the synthesizing control signal SG15 so as to select the second sensitivity characteristic converting unit 106B in step S26. In contrast, as a result of the determination in step S25, if the second determination information SG14 does not represent that the signal of the second interpolating image at the object pixels has a value equal to or larger than the second threshold value, the processing proceeds to step S27. In step S27, the synthesizing control unit 110 outputs synthesizing control signal SG15 so as to select the signal from the first sensitivity characteristic converting unit 106A.

Figure 10:
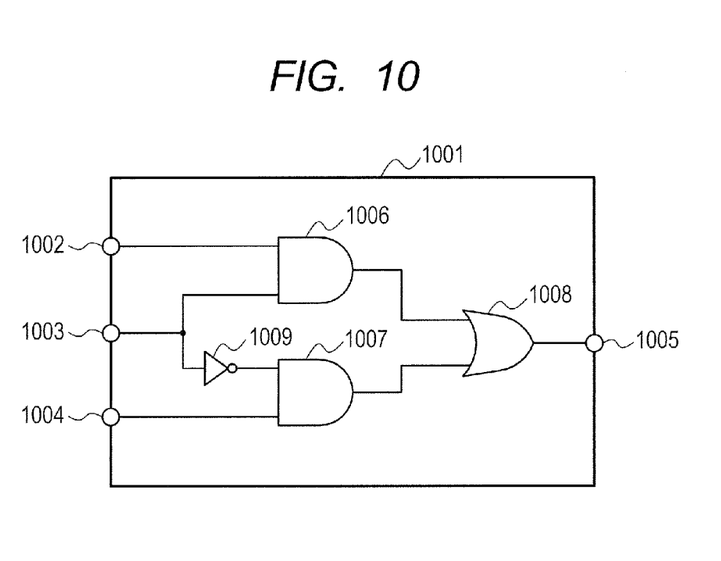
FIG. 10 is a diagram illustrating an example of a configuration of a synthesizing control unit according to the second embodiment.

FIG. 10 is a circuit diagram illustrating an example of the configuration of the synthesizing control unit 110 according to the second embodiment. The process of generating synthesizing control signal SG15 illustrated in FIG. 9 can be implemented by software. Instead, as illustrated in FIG. 10 as an example, the process can be implemented by combination of logic gate devices as hardware.

FIG. 10 illustrates the entire block 1001 of the synthesizing control unit. An input terminal 1002 is for the second determination information SG14. The second determination information SG14 represents that the signal of the second interpolating image has a value equal to or larger than the second threshold value if the information is at the high level. The information represents that the signal of the second interpolating image has a value less than the second threshold in the information has a value less than the threshold if the information is at the low level. An input terminal 1003 is for the interpolation information SG12. The interpolation information SG12 represents that the signal of the first interpolating image at the object pixel is a signal generated by interpolation if the information is at the high level. The information represents that the signal of the first interpolating image at the object pixel is an original signal if the information is at the low level. An input terminal 1004 is for the first determination information SG13. The first determination information SG13 represents that the signal of the first interpolating image has a value equal to or larger than the first threshold value if the information is at the high level. The information represents that the signal of the first interpolating image has a value less than the first threshold value if the information is at the low level.

An output terminal 1005 is for the synthesizing control signal SG15. Here, the image synthesizing unit 104 illustrated in FIG. 1 selects the signal input from the second sensitivity characteristic converting unit 106B as a signal of an output image if the synthesizing control signal SG15 output from the output terminal 1005 of the synthesizing control unit 110 is at the high level. Instead, the image synthesizing unit 104 selects the signal input from the first sensitivity characteristic converting unit 106A as a signal of an output image if the synthesizing control signal SG15 output from the output terminal 1005 of the synthesizing control unit 110 is at the low level.

The three input terminals 1002, 1003 and 1004 are connected to the one output terminal 1005 via four logic gates 1006, 1007, 1008 and 1009. The signals input from the input terminals 1002 and 1003 are input into the AND gate 1006. The signal input from the input terminal 1004 and a signal acquired by the inverter gate 1009 reversing the polarity of the signal input from the input terminal 1003 are input into the AND gate 1007. The output signal of the AND gate 1006 and the output signal of the AND gate 1007 are input into the OR gate 1008. The output signal of the OR gate 1008 is output from the output terminal 1005. Thus, the process equivalent to the process in the flowchart illustrated in FIG. 9 can be implemented by hardware.

Thus, in this embodiment, with reference to the signal levels, it is determined which one of the signal generated by interpolation on one image and the signal without interpolation at the same position on the other image is to be selected to be used. This selection can suppress lack of information at high frequencies, and acquire a high quality image that has a wide dynamic range and a high S/N ratio.

Figure 2:
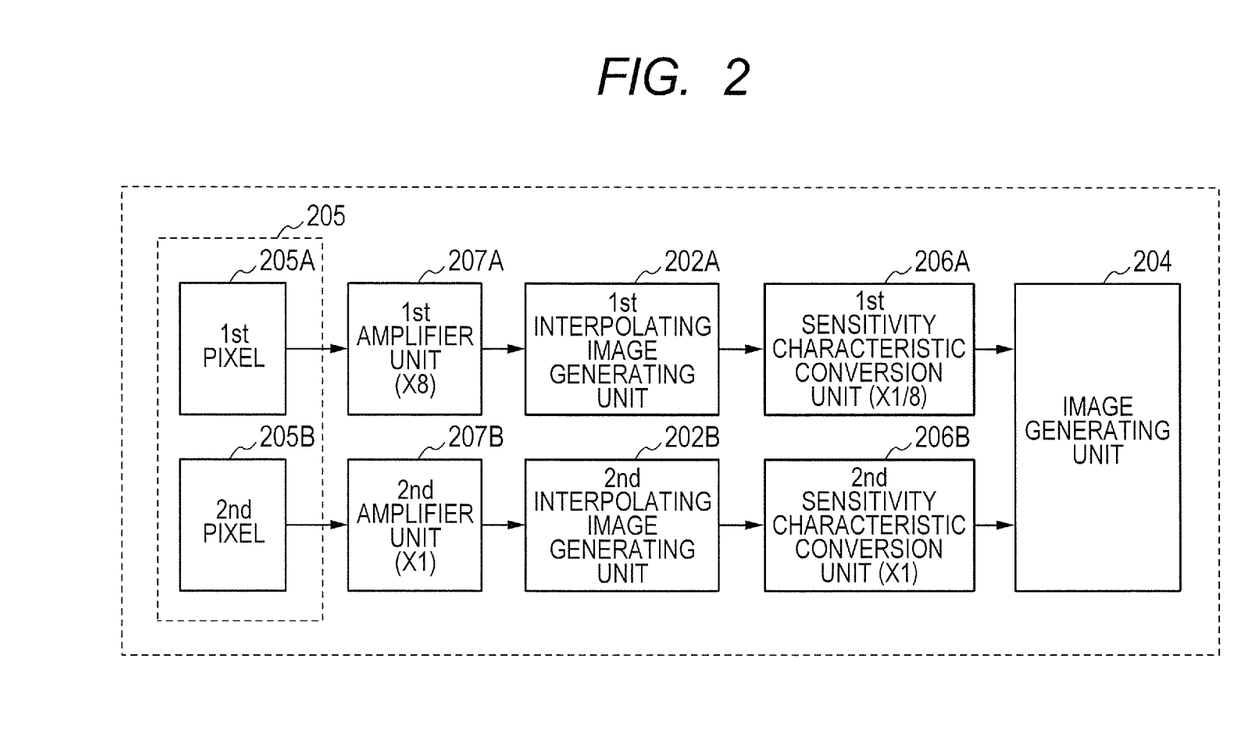
FIG. 2 is a diagram for illustrating a configuration pertaining to first image processing.

As described above, the image processing apparatus according to this embodiment acquires multiple images based on pixel output with the same exposure at a different position, applies pixel interpolation to each of the images to acquire multiple interpolating images, and generates one synthesized image based on the interpolating images. Here, the multiple interpolating images used for generating the synthesized image are formed using the signals of pixels that have the same sensitivity characteristics and are for the same color. For instance, as illustrated in FIG. 2, the image processing apparatus as one aspect of this embodiment includes the pixel unit 205, the amplifier units 207A and 207B, the interpolating image generating units 202A and 202B, the sensitivity characteristic converting units 206A and 206B, and the image synthesizing unit 204. Here, the pixel unit 205, the amplifier units 207A and 207B, and the interpolating image generating units 202A and 202B correspond to the pixel unit 105, the amplifier units 107A and 107B, and the interpolating image generating units 102A and 102B illustrated in FIG. 1, respectively. The sensitivity characteristic converting units 206A and 206B, and the image synthesizing unit 204 correspond to the sensitivity characteristic converting units 106A and 106B, and the image synthesizing unit 104 illustrated in FIG. 1, respectively.

The first interpolating image generating unit 202A performs pixel interpolation on the first image acquired from the signal of the first pixel group including the first pixels 205A of the pixel unit 205. The first interpolating image generating unit 202B performs pixel interpolation on the second image acquired from the signal of the second pixel group including the second pixels 205B of the pixel unit 205 at the same exposure time and exposure timing as those of the first acquired image. The pixels 205A and 205B are pixels that are different, arranged adjacent to each other, and for the same color. The first pixels 205A of the first pixel group have the same sensitivity characteristics. The second pixels 205B of the second pixel group have the same sensitivity characteristics. The image synthesizing unit 204 synthesizes the first interpolating image generated based on the first image and the second interpolating image generated based on the second image to generate the synthesized image with a wide dynamic range. The sensitivity characteristic converting units 206A and 206B are provided before the image synthesizing unit 204, and convert sensitivity characteristics in a manner equivalent to the reciprocals of gains of the respective amplifier units 207A and 207B to convert the first interpolating image and the second interpolating image to have the same sensitivity characteristics.

According to such a configuration, even in the case where the luminance before and after the boundary of the image signal to be synthesized varies at a constant rate, the rate of variation in gradation between the boundary does not change abruptly. Accordingly, occurrence of degradation in image quality, such as pseudo-contours, can be prevented. Thus, the high image quality can be maintained even before and after the boundary. Accordingly, an image processing apparatus can be implemented that can suitably support imaging of a moving object, and acquire an image with a wide dynamic range and a high S/N ratio.

Figure 3:
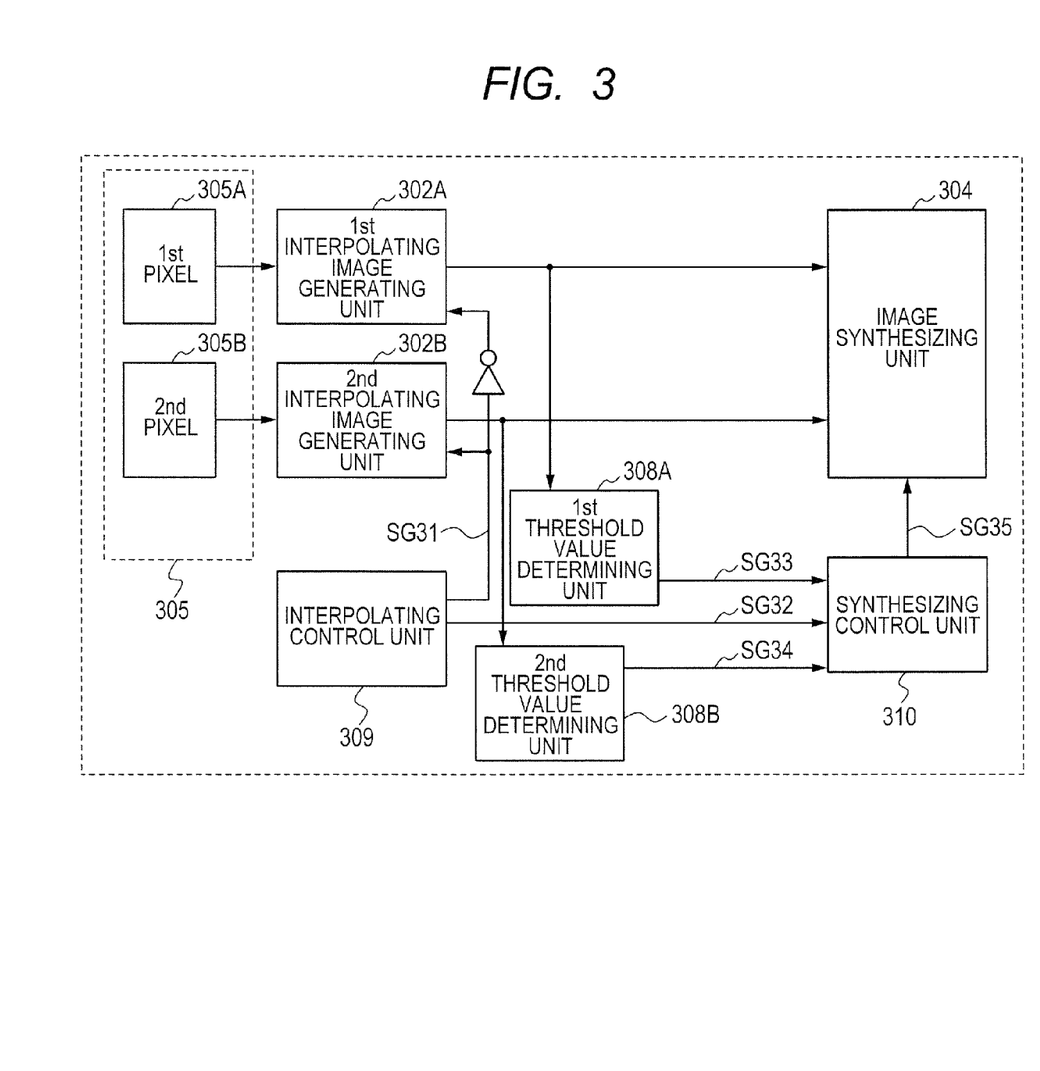
FIG. 3 is a diagram for illustrating a configuration pertaining to second image processing.

The image processing apparatus according to this embodiment generates the synthesizing control signal for synthesizing multiple images on a pixel-by-pixel basis, using not only determination information but also interpolation information. For instance, as illustrated in FIG. 3, the image processing apparatus as another aspect of the present invention includes a pixel unit 305, interpolating image generating units 302A and 302B, an image synthesizing unit 304, threshold determining units 308A and 308B, an interpolating control unit 309, and a synthesizing control unit 310. Here, the pixel unit 305, the interpolating image generating units 302A and 302B, and the image synthesizing unit 304 correspond to the pixel unit 105, the interpolating image generating units 102A and 102B, and the image synthesizing unit 104 illustrated in FIG. 1, respectively. The threshold determining units 308A and 308B, the interpolating control unit 309, and the synthesizing control unit 310 correspond to the threshold determining units 108A and 108B, the interpolating control unit 109, and the synthesizing control unit 110 illustrated in FIG. 1, respectively.

The first threshold determining unit 308A determines whether the level of the signal of the first interpolating image is higher or lower than the first threshold, and outputs the first determination information SG33. The second threshold determining unit 308B determines whether the level of the signal of the second interpolating image is higher or lower than the second threshold, and outputs the second determination information SG34. The interpolating control unit 309 outputs the interpolating control signal SG31, and controls the interpolating operations of the interpolating image generating units 302A and 302B. The synthesizing control unit 310 generates a synthesizing control signal SG35 for controlling image synthesis by the image synthesizing unit 304, based on the first and second pieces of determination information SG33 and SG34 and the interpolation information SG32 from the interpolating control unit 309, and outputs the signal.

With reference to the signal level, it is determined which one of the signal generated by interpolation on one image and the signal without interpolation at the same position on the other image is to be selected to be used. This selection can suppress lack of information at high frequencies, and achieve an image processing apparatus capable of acquiring a high quality image that has a wide dynamic range and a high S/N ratio.

(Another Embodiment of the Present Invention)

The present invention can also be implemented by performing the following process. That is, software (program) implementing functions of the embodiments is supplied to a system or a device via a network or various storing media; the program is read by the computer (CPU or MPU) of the system or the device, and executed.

Each of the embodiments only exemplifies only one example of implementation of the present invention. Accordingly, the technical scope of the present invention should not be construed in a limited manner. That is, the present invention can be implemented in various forms without departing from the technical concepts or principal characteristics.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-254648, filed Nov. 20, 2012, which is hereby incorporated by reference herein in its entirety.

What is claimed is:

1. An image processing apparatus comprising:
    a first interpolating image generating unit configured to interpolate a first image acquired from a plurality of first pixels of a same color having a same sensitivity characteristic based on a signal of the first image, to generate a first interpolating image;
    a second interpolating image generating unit configured to interpolate a second image acquired from a plurality of second pixels for the same color as the color of the first pixels, having the same sensitivity characteristic as the sensitivity characteristic of the first pixels, by the same exposure as the first pixels based on a signal of the second image, to generate a second interpolating image;
    a sensitivity characteristic converting unit configured to convert the first and second interpolating images to have a same sensitivity characteristic; and
    an image synthesizing unit configured to synthesize a synthesized image from the first and second interpolating images converted to have the same sensitivity characteristic by the sensitivity characteristic converting unit.

2. The image processing apparatus according to claim 1, wherein
    the first and second pixels have a same sensitivity characteristic, and
    the image processing apparatus further comprises
    an amplifier unit configured to amplify, at different gains, the first and second signals outputted from the first and second pixels.

3. The image processing apparatus according to claim 1, further comprising:
    a threshold determining unit configured to compare, with a threshold, signal levels of the signals of the first and second interpolating images, to output a determination information indicating a result of the comparing; and
    a synthesizing control unit configured to generate a synthesizing control signal for controlling the synthesizing the image by the image synthesizing unit, wherein
    the synthesizing control unit generates the synthesizing control signal, based on the determination information outputted from the threshold determining unit, and based on an interpolating information for controlling the interpolating operations by the first and second interpolating image generating units.

4. The image processing apparatus according to claim 3, wherein the image synthesizing unit selects and synthesizes, per each pixel, the signal of the first or second interpolating image, to generate the synthesized image.

5. An image processing method using a processor to perform steps comprising:
    interpolating a first image acquired from a plurality of first pixels for a same color having a same sensitivity characteristic based on a signal of the first image, to generate a first interpolating image;
    interpolating a second image acquired from a plurality of second pixels for the same color as the color of the first pixels, having the same sensitivity characteristic as the sensitivity characteristic of the first pixels, by the same exposure as the first pixels based on a signal of the second image, to generate a second interpolating image;
    converting the first and second interpolating images to have a same sensitivity characteristic; and
    synthesizing a synthesized image from the converted first and second interpolating images having the same sensitivity characteristic.

6. A non-transitory computer-readable medium storing a program for causing a computer to execute an image processing method using a processor, the method comprising:
    interpolating a first image acquired from a plurality of first pixels for a same color having a same sensitivity characteristic based on a signal of the first image, to generate a first interpolating image;
    interpolating a second image acquired from a plurality of second pixels for the same color as the color of the first pixels, having the same sensitivity characteristic as the sensitivity characteristic of the first pixels, by the same exposure as the first pixels based on a signal of the second image, to generate a second interpolating image;
    converting the first and second interpolating images to have a same sensitivity characteristic; and
    synthesizing a synthesized image from the converted first and second interpolating images having the same sensitivity characteristic.

* * * * *